United States Patent
Kliger et al.

(10) Patent No.: US 7,028,072 B1
(45) Date of Patent: Apr. 11, 2006

(54) METHOD AND APPARATUS FOR DYNAMICALLY CONSTRUCTING CUSTOMIZED ADVERTISEMENTS

(75) Inventors: Scott A. Kliger, Lincoln, MA (US); Thomas M. Middleton, III, Hingham, MA (US); Gregory T. White, Carlisle, MA (US)

(73) Assignee: Unicast Communications Corporation, New York, NY (US)

( * ) Notice: Subject to any disclaimer, the term of this patent is extended or adjusted under 35 U.S.C. 154(b) by 906 days.

(21) Appl. No.: 09/616,605

(22) Filed: Jul. 14, 2000

Related U.S. Application Data

(60) Provisional application No. 60/144,309, filed on Jul. 16, 1999.

(51) Int. Cl.
*G06F 15/16* (2006.01)

(52) U.S. Cl. .................. 709/203; 709/217

(58) Field of Classification Search .......... 709/203, 709/217, 219, 224; 705/10, 14, 26, 27
See application file for complete search history.

(56) References Cited

U.S. PATENT DOCUMENTS

| | | | | |
|---|---|---|---|---|
| 5,933,811 A | * | 8/1999 | Angles et al. | 705/14 |
| 5,948,061 A | | 9/1999 | Merriman et al. | 709/219 |
| 5,991,735 A | * | 11/1999 | Gerace | 705/10 |
| 6,009,410 A | * | 12/1999 | LeMole et al. | 705/14 |
| 6,026,371 A | * | 2/2000 | Beck et al. | 705/14 |
| 6,128,663 A | * | 10/2000 | Thomas | 709/228 |
| 6,285,987 B1 | * | 9/2001 | Roth et al. | 705/27 |
| 6,321,256 B1 | * | 11/2001 | Himmel et al. | 705/14 |
| 6,324,685 B1 | * | 11/2001 | Balassanian | 717/118 |
| 6,353,849 B1 | * | 3/2002 | Linsk | 709/203 |
| 6,487,538 B1 | * | 11/2002 | Gupta et al. | 705/14 |
| 6,516,338 B1 | * | 2/2003 | Landsman et al. | 709/203 |
| 6,553,417 B1 | * | 4/2003 | Gampper | 709/203 |
| 6,785,659 B1 | * | 8/2004 | Landsman et al. | 705/14 |

FOREIGN PATENT DOCUMENTS

| | | |
|---|---|---|
| WO | WO 98/53406 | 5/1998 |
| WO | WO 98/58334 | 6/1998 |
| WO | WO 00/08802 A2 | 7/1999 |
| WO | WO 00/08802 A3 | 7/1999 |

* cited by examiner

*Primary Examiner*—David Wiley
*Assistant Examiner*—Yemane M. Gerezgiher
(74) *Attorney, Agent, or Firm*—Michaelson & Associates; Peter L. Michaelson; Alberta A. Vitale

(57) ABSTRACT

A method and apparatus providing for the construction of customized advertisement banners for Web pages on a client computer. The advertisement banners are customized based upon various factors including user profile information, technographic information, geographic information, demographic information and user interaction information. The information being either stored on the user's computer, server computers or obtained from the user's interaction with the Web page containing the advertisement banner. Once specific information is obtained, customized advertisement content is selected from Web server computers and the advertisement banner is dynamically constructed and displayed on the user's computer.

7 Claims, 4 Drawing Sheets

METHOD AND APPARATUS FOR DYNAMICALLY CONSTRUCTING CUSTOMIZED ADVERTISEMENTS

RELATED APPLICATION(S)

This application claims the benefit of U.S. Provisional Application No. 60/144,309, filed Jul. 16, 1999, the entire teachings of which are incorporated herein by reference.

BACKGROUND OF THE INVENTION

The World Wide Web of hypertext interlinked documents residing on networked computer servers located throughout the Internet has become a very popular mechanism for distributing information of various types among a wide audience at low cost. Selling advertising space on the Web has become a dominant way of covering the costs associated with presenting certain information. For example, content providers, such as Cable News Network (CNN) and *U.S.A. Today*, now provide highly detailed and sophisticated information at their Web sites for free. These sites are typically supported, at least in part, by the advertising they display.

Information is typically viewed on the Web using a browser program running on a client computer. A browser can read Web pages, built using Hyper Text Markup Language ("HTML"), downloaded from a Web server and display the contents. HTML provides the capability to display text, graphics, hypertext links, interactive applets and streaming audio/video. A Web browser can also read and write "cookies". Cookies are blocks of data that a Web server may store on a client computer and later retrieve to obtain information from the client computer. Most current generation Web browsers also run small segments of computer code which are transported over the Internet and executed on the client machine. They are typically written as Java™ applets and are run when referenced from a Web page.

Advertisers now increasingly seek ways to entice Web users who are casually browsing by grabbing their attention or perhaps even ultimately engaging them in an electronic commerce transaction, without actually requiring them to perform other processes which are perceived as being cumbersome. For example, it is now quite common for most Web pages to contain "banner ads" that contain attention-grabbing multimedia effects. Such effects are typically enabled by applet programs that not only present elaborate images, but also present animated objects and sounds.

SUMMARY OF THE INVENTION

Briefly, the present invention provides a system for customizing Web page based advertisements based upon various factors including targeting (profile) information, technographic information, historical preferences, geographic information, demographic information or user interaction. These factors may be used individually or combined to create an effective customized advertisement. Targeting information can include information specific to a particular user and may be stored externally and accessed by a profile process.

More particularly, experience with print and television media have shown that general advertisements are not as effective as customized advertisements targeted to specific situations and/or consumers in attracting them to further investigate or purchase the products or services. Advertisements directed to groups of users through demographics or other attributes have been proven to be more effective than general advertisements, but not as effective as those customized for specific individuals.

Unfortunately, in the context of the World Wide Web, creating and storing customized advertisements for specific users is cumbersome because a large number of individual advertisements may be required to appeal to individuals in a specific audience. Managing a large number of advertisements is costly, both in terms of storage and processing. Delivering customized advertisements to a large user population, for products and services that have many options, could quickly overwhelm even a large, powerful Web server.

The present invention overcomes these problems by dynamically creating the advertisement on the user's computer using information obtained about the user at the time of displaying the advertisement. When a user requests a Web page containing an advertisement banner, a fragment of the banner is returned in the Web page along with a reference to an applet. The applet contains logic for deciding how to choose from among various possible elements which are needed to complete the construction of the advertisement banner. The logic may, for example, obtain information about the specific user and requests additional advertisement content from Web servers to complete the creation of the advertisement to be displayed to the user.

More specifically, both a method and apparatus may be provided for creating customized advertisement banners for Web pages. The advertisement banners are customized for specific users based upon information about the specific user viewing the page or based upon other criteria by using an applet program which is within the context of the browser program running on the user's computer. The user is identified by either an identifier stored on the user's computer or from the user's interaction with the Web page containing the advertisement banner. Once user specific information is obtained, specific advertisement content is obtained from one or more Web server computers and the advertisement banner is dynamically constructed and displayed on the user's computer using that specific content.

An advantage of this dynamic construction within the context of the browser is that the advertisement content can easily and inexpensively be tailored for the individual users; for example, if information about the user's occupation can be obtained, an area of the advertisement that scrolls news stories might target stories related to that user's occupation. This may be done to draw a user's attention to the advertisement banner.

An additional advantage of dynamically constructing the advertisement on the user's computer is that it requires less storage at the Web server and less bandwidth over the network. This is a result of being able to eliminate the need to create, store and send all possible combinations of advertisement for a target audience.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
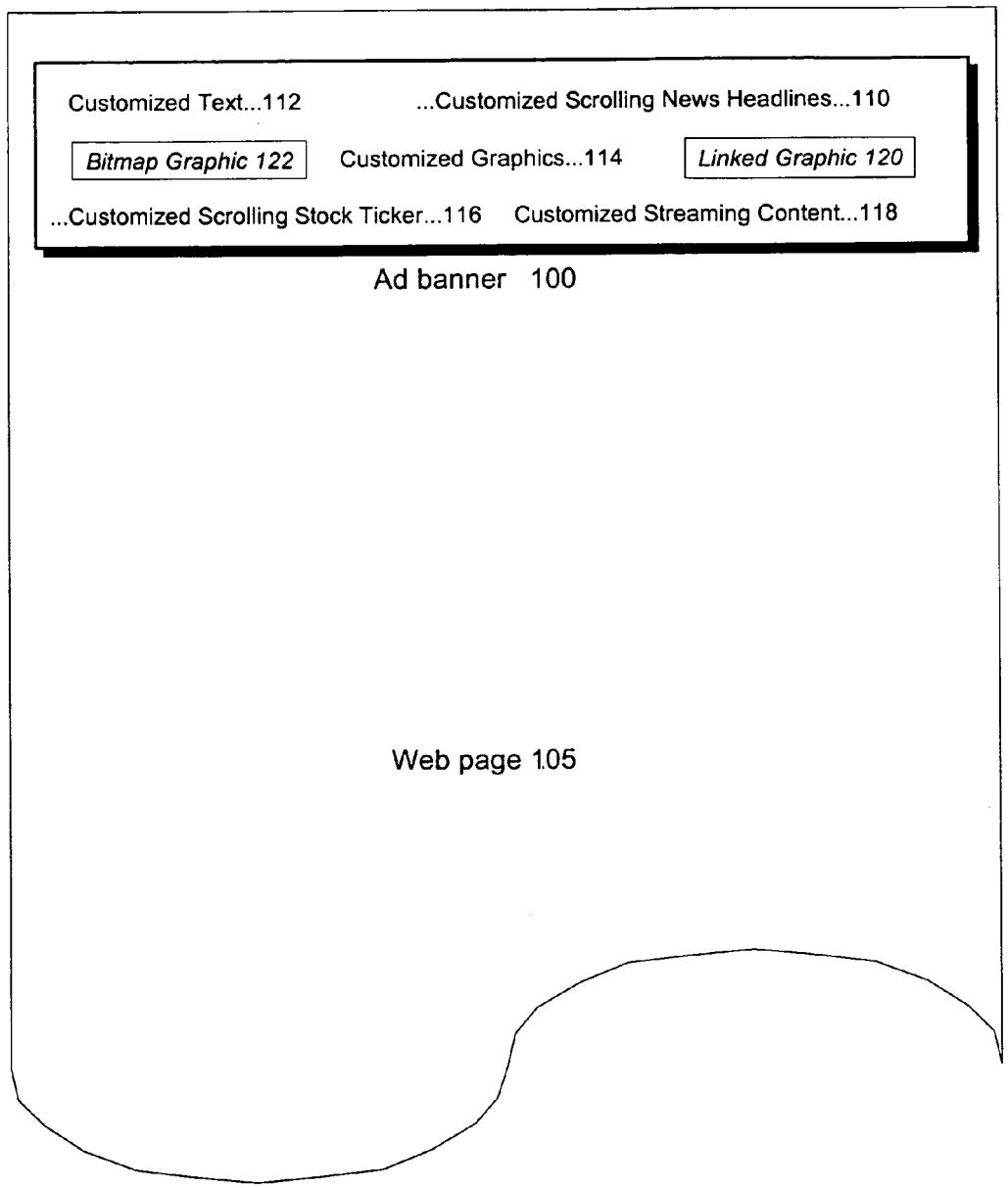
FIG. 1 is an illustration of an example advertisement banner displayed on a Web page.

FIG. 1 shows an example Web page 105 containing an advertisement ("Ad") banner 100 with a variety of advertising content types, some of which may be general and displayed identically to all viewers of the advertisement banner 100. Other content may be customized and display differently based upon a number of situation specific factors which are evaluated to construct the Ad banner 100 at the time of viewing it. It should be noted that content types that display within Ad banner 100 can be fixed and stored as part of the Web page 105 as sent to the client computer, or can be dynamically created using an applet sent as part of Web page 105 to the client computer.

Customized scrolling news headlines 110 and customized stock ticker 116 represent advertising content types that can display customized information in a scrolling (horizontal and/or vertical) fashion. For example, a user known to be interested in baseball may see a scrolling list of scores for current games. In like fashion, if a list of stocks that a user is interested in is obtainable, that list can be used to construct a scrolling ticker of up-to-date stock prices. Data for these scrolling items may be obtained from a variety of Web servers.

Customized text 112 and customized graphics 114, specifically tailored for the user viewing the Ad banner 100 can also be displayed by the Web browser using an applet. The applet uses the identity of the user to customize the customized text 112 and/or graphics 114. The actual text and graphics displayed may be obtained from a variety of Web servers.

Bitmap graphic 122 represents a bitmap graphic image stored in the Ad banner 100 of Web page 105. An example use for bitmap graphic images in advertisement banner is the display of a company logo, which may not change based upon the user who is viewing it. Linked graphic 120 provides a hypertext link to other Web pages (or other parts of this Web page) on the Web. The linked graphic 120 can display text (e.g., a Uniform Resource Locator ("URL")) or a graphic as the launch point for the linked Web page. The exact contents of what the link references may not be known at the time the Ad banner 100 is constructed, that is the link may point to time-sensitive information or to information that changes based upon other conditions (e.g., breaking news reports).

Customized streaming content 118 can display streamed audio and video content in the Ad banner 100. This data can also be specific to the user viewing the Web page 105 and obtained from a variety of Web servers.

Technographic information includes information obtainable about a user's environment (computer and otherwise). Some examples of technographic information include the user's network bandwidth, web browser version, operating system version, computer audio capabilities, time of day, day of week/year and outside ambient temperature. Geographic information may include, physical location as well as Internet domain type/name, Internet Service Provider name as well as the URL hosting the Web page containing the advertisement. Demographic information includes characteristics about the user herself, for example, age, gender, likes, dislikes and income. User interaction information can be tracked and used in customizing the advertisement, for example, a users actions while playing a game displaying within the advertisement can produce different subsequent displays.

Figure 2:
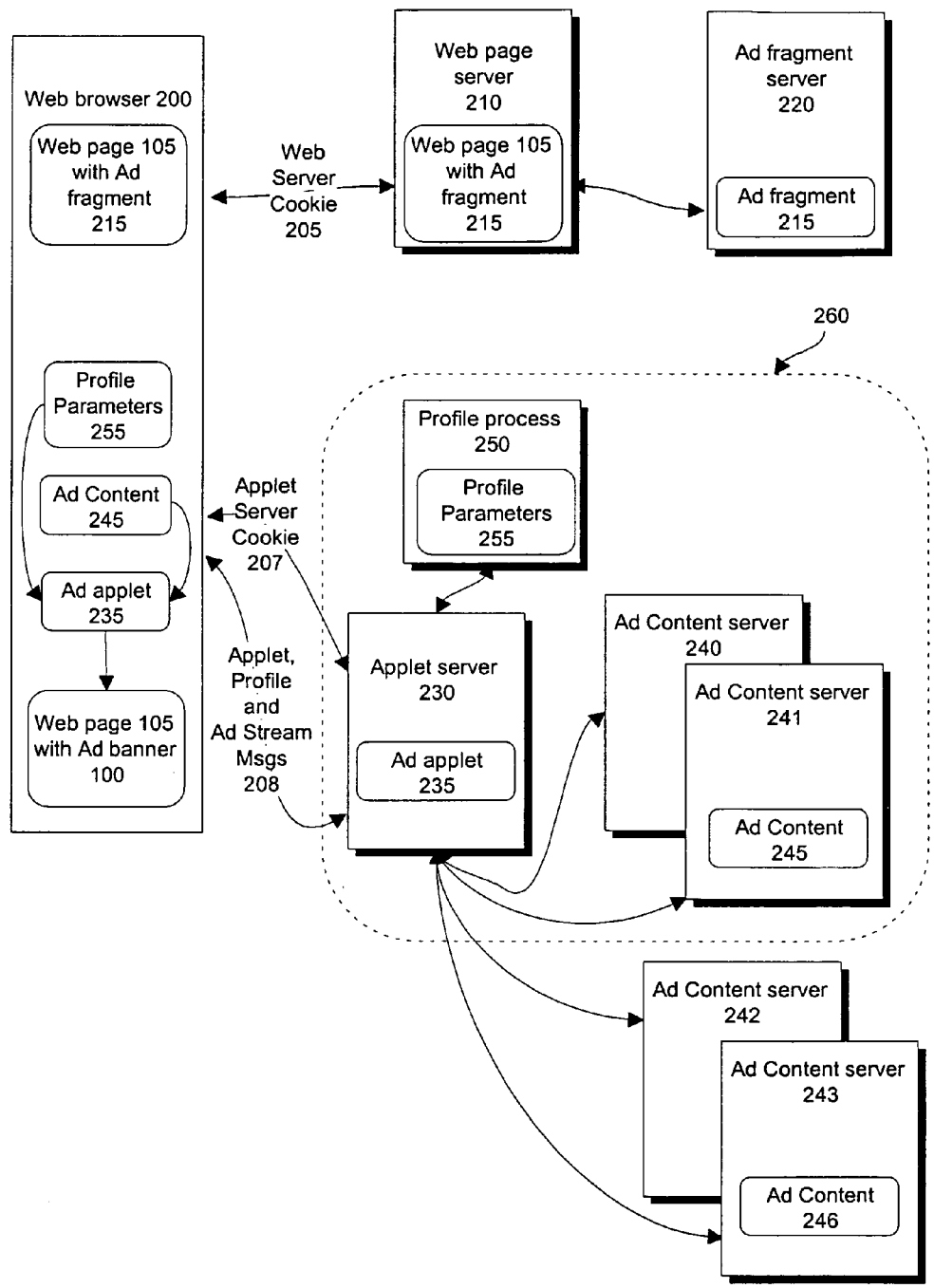
FIG. 2 is a block diagram of a system for dynamically creating customized advertisements.

FIG. 2 illustrates an architecture providing the capability of dynamically creating a customized Ad banner 100 on a client computer based upon a user profile. The client computer with Web browser 200 requests a Web page from a Web server 210 using a URL passing Web server cookie 205 (if it exists). If no cookie for the Web page server 210 exists on the client computer, the Web page server 210 will store one as part of this communication. The Web server cookie 205 is stored on the client computer by including a SET-COOKIE header as part of a Web page returned to a client Web browser 200. SET-COOKIE takes a series of parameters that allow information about the cookie to be customized. Data can be stored by use of the NAME=VALUE parameter, in a minimal configuration, NAME=VALUE is the only required parameter of the SET-COOKIE header. VALUE is a string of characters (excluding semi-colon, comma and white space) that contains the data that the Web server wants to store on the client computer. NAME=VALUE is the only required parameter.

However, other parameters may be included with the SET-COOKIE header. In one instance, an EXPIRES=DATE parameter is used inform the server when the data in the cookie is no longer valid. Once the expiration date has been reached, the cookie will no longer be stored or given out. Additionally, the user can use this date to determine which cookies to delete from their computer. If no EXPIRES=DATE is set then the cookie will expire at the end of the user's session.

A DOMAIN=DOMAIN_NAME parameter is used to store the valid domain to which this cookie will be returned. When a request for a Web page is made its URL is compared to the DOMAIN of cookies stored on the client computer. If a match is found that cookie is send along with the request for the Web page to that URL. Matching need not be exact. For example, a technique of "tail-matching" may be used where the URL is compared against the top-level domain and the next level domain up can be used to force the cookie to be sent to a number of related URLs. The default DOMAIN_NAME is the domain of the Web server which generated the cookie.

A PATH=PATH parameter is used to specify a subset of the URLs within a domain which are to receive this cookie. If PATH is not specified it defaults to the path of the Web page described in the requested URL. SECURE is a setting within a cookie that is used to ensure that this cookie will only be returned when the communications channel is secure (e.g., HTTP over SSL). These URL requests are often carried out using a common gateway interface ("CGI") standard known to Web servers and browsers for defining communication between client computers and information servers (e.g., Web server 210). A Web page server 210 contains various Web pages of interest to the user of the Web browser 200. These Web pages may contain advertisement banners for display. The Ad banners 100 can be stored on separate Ad servers 220, or the Ad banners 100 can be stored on Web page server 210 itself. Each Ad banner 100 may be a fully-constructed advertisement (i.e., a basic Ad stream) or an Ad fragment (i.e., sparse Ad stream). An Ad fragment 215 can contain connection information to another server (e.g., Applet server 230). The Ad fragment 215, requested by the Web server 210, is returned as part of the Web page 105 that the Web browser 200 requested from the Web page server 210.

The Web page 105 with Ad fragment 215 contains connection information the Web browser 200 uses to communicate with Applet server 230. The Applet server 230 uses the information contained in Applet server cookie 207 to communicate with a profile process 250. The profile process 250 accesses a profile data base have information associated with Applet server cookie 207. The profile process 250 can retrieve profile parameters 255 from the profile database that will be used to customize the Ad banner 100 for a specific user of Web browser 200 identified by Applet server cookie 207. The profile parameters 255 are returned to Web browser 200.

Technographic information includes information obtainable about a user's environment (computer and otherwise). Some examples of technographic information include the user's network bandwidth, web browser version, operating system version, computer audio capabilities, time of day, day of week/year and outside ambient temperature. Geographic information may include, physical location as well as Internet domain type/name, Internet Service Provider name as well as the URL hosting the Web page containing the advertisement. Demographic information includes characteristics about the user herself, for example, age, gender, likes, dislikes and income. User interaction information can be tracked and used in customizing the advertisement, for example, a users actions while playing a game displaying within the advertisement can produce different subsequent displays.

The profile parameters 255 contains a pointer to an Ad applet 235 stored on the Applet server 230 and a set of profile parameters. The Ad applet 235, running on the client computer, will use the profile parameters to construct a user specific Ad banner 100. The Applet server 230 accepts applet server cookie 207 (if it exists) and serves the Ad applet 235 to the Web browser 200 on the client computer. An applet is a small segment of code that can be transported over the Internet and executed on a client computer. Applets are typically written in Java™ and executed in a Java Virtual Machine ("JVM"), most Web browsers implement a JVM for running applets. Applets inherit from, and extend, the Java Applet class. Applets can play sounds, make network connection to the host they came from, display HTML documents and invoke public methods of other applets on the same Web page. For security reasons, applets that are loaded over a network (e.g., the Internet) have several restrictions. One restriction is that an applet cannot ordinarily read or write files on the computer that is executing it (cookie files being an exception). Another restriction is that an applet cannot make network connections except to the host that served it.

Applets are invoked from an HTML Web page using the <APPLET> tag. The <APPLET> tag allows the specification of an applet name attribute (CODE=), as well as the height (HEIGHT=) and width (WIDTH=) attributes of the applet display in pixels. Parameters may be passed to the applet using the parameter name (PARAM NAME=) and value (VALUE=) attributes. The location of the applet class file may also be specified using the (CODEBASE=) attribute.

The Web page 105 with Ad banner 100 is loaded by the Web browser 200 invoking the Ad applet 235. The Ad applet 235 served by the Applet server 230, will communicate with the Applet server 230 to provide the user specific content used in the construction of Ad banner 100. The Applet server 230 may communicate with a variety of content servers 240–243 to provide the content 245, 246 needed by the Ad banner 100. These Content servers 240–243 may be HTML protocol Web servers or other information servers (e.g., database servers). The Ad applet 235 may optionally request additional advertisement content as needed, either to customize the Ad banner 100 for the specific user or to expand "sparse" advertising content previously returned. Sparse advertising content is content that requires additional communication in order to be fully displayed. This delayed approach to streaming advertising content to a client computer has the advantage of reducing the amount of content downloaded in situations when it may never need to be displayed. Content may not need to be displayed based upon a user's profile or the user's interaction with the Ad banner 100 or Web page 105 itself.

In one preferred embodiment a server hosting framework 260 houses the applet server 230 and some number of content servers 240, 241. In addition the profile process 250 can be hosted as part of applet server 230 or as a separate server. The server hosting framework can provide certain optimizations based upon communications efficiencies, but is not a required configuration. Embodiments of the present invention exist independently of the network configuration of the various servers.

In one example a user, Dave, starts his personal computer, launches his Web browser (e.g., Microsoft Internet Explorer) and connects to the Internet. Using his Web browser he requests a Web page from the URL "http://www.yahoo.com", his Web browser sends the URL and any cookie that www.yahoo.com has stored on Dave's personal computer to the www.yahoo.com Web server. When www.yahoo.com receives Dave's request it parses the cookie and determines an appropriate Ad banner to display along with the www.yahoo.com homepage. The Ad banner may be located locally on the www.yahoo.com host or it may be stored remotely on another Ad server. Assume the Web server choose an Ad banner for Folgers coffee.

If the Ad banner is one configured according to an embodiment of the present invention it may only be sparsely populated, awaiting more customization based upon the specific user, demographic or technographic information associated with the personal computer onto which it will be displayed. In this case the sparsely populated Ad banner (i.e., Ad fragment) will contain a link to an applet server capable of aiding in the construction of a Folgers coffee Ad banner customized for Dave at his personal computer. Once the applet server has been contacted it can use an applet server cookie to "identify" Dave and look-up know profile parameters for Dave along with an applet to download. Additionally, profile parameters may be returned that indicate time-of-day, region or country and other relevant information. The profile parameters and applet are download. With the applet running it uses the profile parameters to request additional Ad content to construct an Ad banner customized specifically for Dave at this time. For example, if it can be determined that Dave is an upper-income individual and that it is late evening when Dave requested the www.yahoo.com URL an embodiment of the present invention may construct a Folgers coffee Ad Banner featuring Folgers Premium French Roast de-caffeinated blend. Dave, launching his Web browser the next morning might be greeted by a different Folgers Ad banner featuring a double-espresso blend. In this way, embodiments of the present invention allow for dynamic Ad banners to be constructed on users' personal computers.

Figure 3:
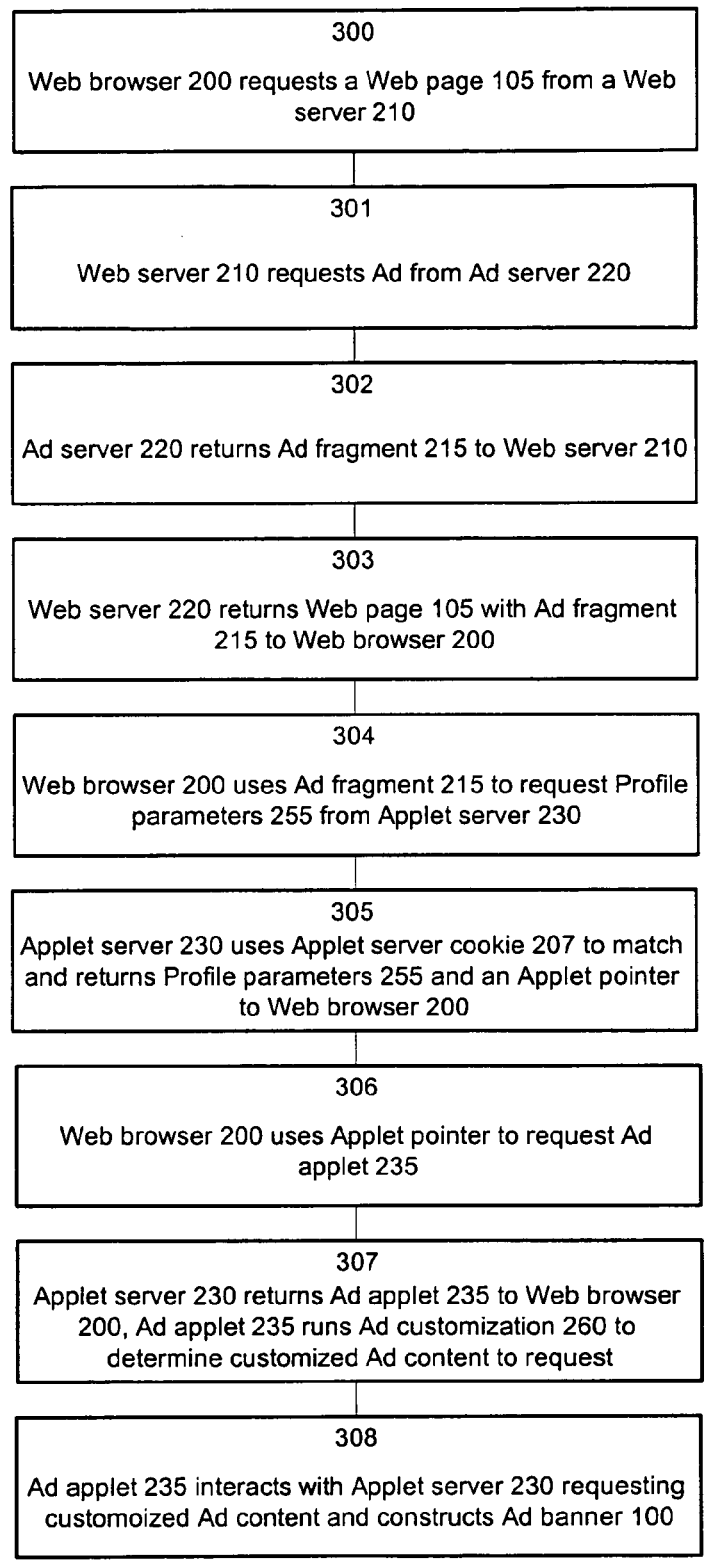
FIG. 3 is a flowchart showing the steps involved in dynamically creating advertisements.

FIG. 3 illustrates a schematic flowchart showing the steps involved in dynamically creating an Ad banner 100 customized for a specific users on a client computer. The process begins at step 300 where a user invokes the client Web browser 200 to view a Web page 105 downloaded from a Web server 210 by specifying a URL. In step 301 the Web server returns the Web page 105 including an Ad banner 100 for inclusion in the display of the Web page 105. The Ad banner 100 is typically retrieved from an Ad server 220 that stores many Ad banners 100, although storing the Ad banners 100 locally is also possible. Ad banners 100 may have been constructed with standard authoring tools such as the Director product available from Macromedia, Incorporated, San Francisco, Calif. The Ad banners 100 can be fully constructed advertisements without the option of being customized for user-specific profiles (e.g., GIF based) or they may contain Ad fragments 215 that allow customization prior to display to the end-user.

In step 302 the Ad banner 100, with the Ad fragment 215, is returned to the Web server 210. The Web server 210 then returns the Web page 105, including the Ad banner 100 with Ad fragment 215 to the Web browser 200 at step 303. In step 304 the Web browser uses the Ad fragment (which contains the URL of an Applet server 230) and the applet server cookie 207 associated with the Applet server 230 to request an Ad applet 235 and profile parameters 255.

In step 305 the profile process 250 matches the applet server cookie 207 with information accessible to profile process 250. Having matched the applet server cookie 207 to a record accessible to profile process 250, profile parameters 255 associated with a specific user are then extracted. Profile process 250 can be a process running within Applet server 230 or it can be running on a separate server. The profile parameters 255, along with a pointer to a specific Ad applet 235, are then returned to the Web browser 200. The Web browser 200 request a specific Ad applet from the Applet server 230 in Step 306.

In Step 307 the Ad applet 235 is returned by the Applet server 230 to the client Web browser 200. In Step 308 the Ad applet 235 executes and constructs the Ad banner 100 that will be displayed. The Ad applet 235 may contain a basic Ad stream 410 (see FIG. 4*a*) which has all its advertising content self-contained or by a sparse Ad stream 450 (see FIG. 4*b*) that contains place holders for certain advertising elements. The place holders are used to delay the retrieval of advertising content that may present bandwidth problems, be it context (e.g., time) sensitive content or content only displayed in limited circumstances. For example, an Ad with a large audio clip may be requested by a client Web browser 200 connected to a Web server 210 over a low-bandwidth telephone-line. The Ad applet may determine that the bandwidth constraints are prohibitive for playing the audio element and decide to skip over it as defined in the sparse Ad stream 450. This flexibility would not be possible in a basic Ad stream 410. In another example, the sparse Ad stream may contain a placeholder to an Ad element that changes periodically (e.g., a stock quote). In this situation, the Ad applet 235 is able to retrieve the most recent value of the stock quote Ad element as it constructs the Ad banner 100 for display. Once all placeholder elements are retrieved the Ad applet 235 displays the Ad banner 100 on a client computer display.

Figure 4A:
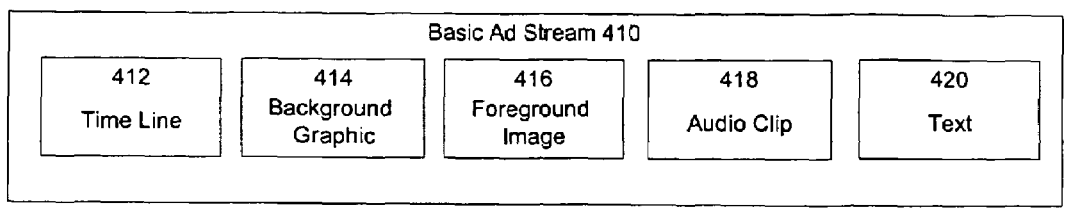
FIG. 4a is an illustration of a basic Ad stream.

FIG. 4*a* is an illustration of a basic Ad stream 410. The basic Ad stream contains Ad content objects for use in displaying an Ad banner 100 on a client computer display using a client Web browser 200. For example, a basic Ad stream may contain a time line 412, background graphics 414, foreground images 416, audio clips 418 and blocks of text 420. The time line 412 is information that the client Web browser uses to manage the display and playback of each Ad content object. The background graphics 414 and foreground images 416 may be stored in a variety of formats (e.g., GIF, JPEG, BMP) and enhance the visual appeal of Ad banners 100. Graphical and image Ad objects can be quite large and their transmission can present problems on low-bandwidth connections. Audio clips 418 enhance Ad banners 100 with sound, as with the graphic images, audio clips can also be quite large and present similar bandwidth related problems. Text 420 for display in the Ad banner 100 may be included in the basic Ad stream.

Figure 4B:
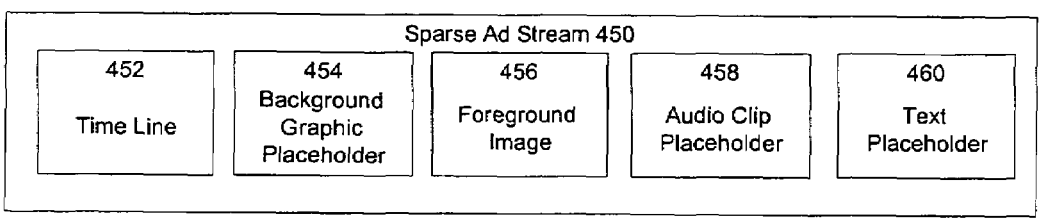
FIG. 4b is an illustration of a sparse Ad stream.

FIG. 4*b* is an illustration of a sparse Ad stream 450. The sparse Ad stream 450 can contain any Ad content object that is stored in a basic Ad stream 410, with the added feature of allowing some (or all) of the Ad content objects being place holders. Place holders contain a reference (or pointer) to content of an Ad element as opposed to the content itself. The sparse Ad stream 450 contains a time line 452, similar to the time line 412 in the basic Ad stream 410, to manage the display and playback of each Ad content objects. In this example the foreground image 456 is a non-placeholder and contains all the content needed for it to be displayed. Background graphic placeholder 454, audio clip placeholder 458 and text placeholder 460 contain pointers to the underlying content and can be references only if and when needed. Alternatively, the place holders can be updated on a periodic basis to reference time sensitive information.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for dynamically providing a visual representation of a customizable advertisement within the context of a browser program running on a client computer comprising the steps of:
   (a) downloading a Web page file from a Web server, the Web page file including at least one advertising fragment;
   (b) locating an advertising applet program on an applet server using the advertising fragment, the advertising applet program containing program logic specifying how to construct the customizable advertisement;
   (c) running the advertising applet program within the context of the browser program at the client computer to execute the program logic to construct the visual representation of the customizable advertisement;
   (d) determining run time specific information for constructing the customizable advertisement; and
   (e) using the run time specific information as input to the advertising applet program when constructing the visual representation of the customizable advertisement.

2. The method of claim 1 wherein run time specific information is obtained from reading a Web browser cookie file.

3. The method of claim 1 wherein the run time specific information is obtained from reading a computer specific identifier from the client computer.

4. An apparatus for dynamically providing a Web page with a user specific advertisement banner on a client computer display comprising:
- a Web browser requesting a Web page stored on a Web server containing an advertising fragment;
- a reference to an advertising applet program on an applet server obtained using the advertising fragment;
- the advertising applet program constructing the advertisement banner on the client computer for display in the Web browser;
- run time specific information for constructing the customizable advertisement; and
- where the advertising applet program uses the run time specific information as input when constructing the advertisement banner.

5. The apparatus of claim 4 wherein user specific information is obtained from reading a Web browser cookie file.

6. The apparatus of claim 4 wherein the user specific information is obtained from reading a computer specific identifier from the client computer.

7. A computer program product comprising:
- a computer usable medium comprising:
  - a set of computer program instructions embodied on the computer usable medium, including instructions to:
- download a Web page file from a Web server, the Web page file including at least one advertising fragment;
- locate an advertising applet program on an applet server using the advertising fragment, the advertising applet program containing program logic specifying how to construct the customizable advertisement;
- run the advertising applet program within the context of the browser program at the client computer to execute the program logic to construct the visual representation of the customizable advertisement;
- determine run time specific information for constructing the customizable advertisement; and
- use the run time specific information as input to the advertising applet program when constructing the visual representation of the customizable advertisement.

* * * * *